US008543062B2

(12) United States Patent  
Hildebrand et al.

(10) Patent No.: US 8,543,062 B2  
(45) Date of Patent: *Sep. 24, 2013

(54) RADIO COMMUNICATION DEVICE, RECEIVER CONTROLLER OF A RADIO COMMUNICATION DEVICE, METHODS FOR SEARCHING FOR A RADIO CELL

(75) Inventors: Uwe Hildebrand, Nuremberg (DE); Marcus Hoepfner, Nuremberg (DE); Hans Bauernfeind, Nuremberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 121 days.

This patent is subject to a terminal disclaimer.

(21) Appl. No.: 13/211,924

(22) Filed: Aug. 17, 2011

(65) Prior Publication Data

US 2011/0312274 A1 Dec. 22, 2011

Related U.S. Application Data

(63) Continuation of application No. 11/939,626, filed on Nov. 14, 2007, now Pat. No. 8,023,896.

(51) Int. Cl.
*H04B 15/00* (2006.01)
*H04K 3/00* (2006.01)

(52) U.S. Cl.
USPC ........... 455/62; 455/434; 455/515; 455/552.1

(58) Field of Classification Search
USPC ................... 455/62, 426.1, 434, 515, 552.1
See application file for complete search history.

(56) References Cited

U.S. PATENT DOCUMENTS

| 8,023,896 B2* | 9/2011 | Hildebrand et al. ........... 455/62 |
| 2002/0087674 A1 | 7/2002 | Guilford et al. |
| 2003/0232631 A1 | 12/2003 | Ohmori |
| 2004/0224684 A1 | 11/2004 | Dorsey et al. |

FOREIGN PATENT DOCUMENTS

| DE | 10 2005 033 464 A1 | 2/2007 |
| EP | 0 948 226 A2 | 10/1999 |
| EP | 1 641 293 A1 | 3/2006 |

OTHER PUBLICATIONS

3GPP TS 45.005 V4.1.1 (Nov. 2000); Technical Specification; 3rd Generation Partnership Project; Technical Specification Group GERAN; Digital cellular telecommunications system (Phase 2+); Radio transmission and reception (Release 4).
TS 25.101V2.1.0(Jun. 1999); 3$^{rd}$ Generation Partnership Project (3GPP); Technical Specification Group (TSG) RAN WG4 UE Radio transmission and Reception (FDD).

* cited by examiner

*Primary Examiner* — Lee Nguyen
(74) *Attorney, Agent, or Firm* — Schiff Hardin LLP (57) ABSTRACT

Embodiments relate generally to a radio communication device, to a receiver controller of a radio communication device, and to a method for searching for a radio cell. In an embodiment, a method for searching for a radio cell is provided. The method may include scanning at least one frequency band of a first radio access technology, scanning at least one frequency band of a second radio access technology, wherein the at least one frequency band of the second radio access technology at least partially overlaps with the at least one frequency band of the first radio access technology, wherein at least one frequency sub-band of the first radio access technology is not scanned in the at least one frequency band of the second radio access technology.

28 Claims, 4 Drawing Sheets

RADIO COMMUNICATION DEVICE, RECEIVER CONTROLLER OF A RADIO COMMUNICATION DEVICE, METHODS FOR SEARCHING FOR A RADIO CELL

CROSS REFERENCE TO RELATED APPLICATION

This application is a continuation of U.S. patent application Ser. No. 11/939,626, which was filed Nov. 14, 2007. This application is incorporated herein by reference in its entirety.

TECHNICAL FIELD

Embodiments of the application relate generally to radio communication devices, to a receiver controller of a radio communication device, and to methods for searching for a radio cell.

BACKGROUND

Already today cellular mobile phone devices may support a plurality of different radio access technologies (RATs) in order to automatically select a RAT to provide services to the user, to enable the user to select one of these RATs for providing its services or to autonomously fall back to another RAT in case missing coverage by the currently selected RAT. An example for such a type of cellular mobile phone device is a conventional dual-mode cellular mobile phone device supporting Global System for Mobile Communication (GSM)/ (Enhanced) General Packet Radio Service ((E)GPRS) and Universal Mobile Telecommunications System (UMTS). In future, e.g. with the deployment of Long Term Evolution (LTE) evolved UMTS Radio Access Network (eUTRAN), even triple-mode cellular mobile phone device will become more and more common.

For a cellular mobile radio communication system implementing a certain radio access technology, several frequency bands may be standardized and allocated for each radio access technology. By way of example, for GSM, possible frequency bands are GSM 850, GSM 900, GSM 1800, GSM 1900. Furthermore, for UMTS, possible frequency bands are Band I (2100), Band II (1900), Band III (1800), Band IV (2100), Band V (850), Band VI (850), and Band VII (2600) and others.

During an initial radio cell search (or during another type of a global radio cell search), a multi-mode, multi-band mobile radio phone usually scans all possible and supported frequency bands of all supported RATs for radio cell carriers in order to decide which radio cell shall be selected, i.e. on which radio cell the subscriber should camp.

Obviously, the time needed for such a radio cell search increases with the number of supported RATs and frequency bands. And it shall be pointed out that this time will also be noted by the user of the mobile radio phone device as the time until he is able to use cellular services via his mobile radio phone device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the application. In the following description, various embodiments of the application are described with reference to the following drawings, in which.

DESCRIPTION

Figure 1:
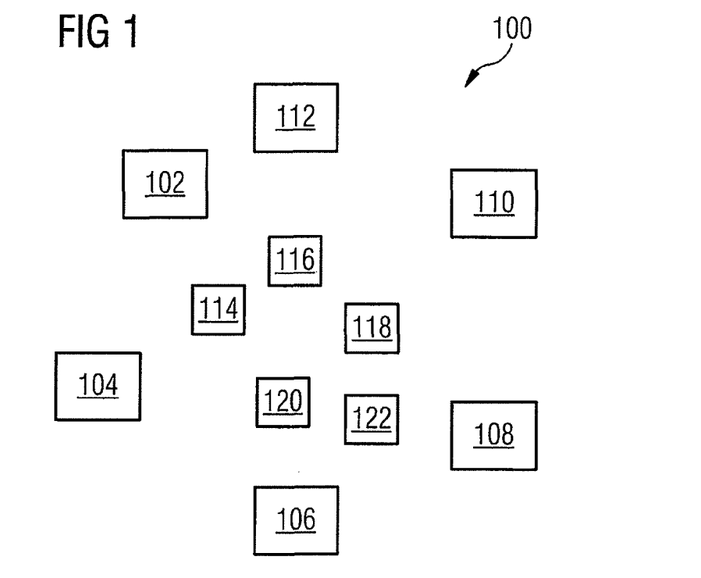
FIG. 1 shows a mobile radio communication system arrangement in accordance with one embodiment.

FIG. 1 shows a mobile radio communication system arrangement 100 in accordance with one embodiment.

In an embodiment, the mobile radio communication system arrangement 100 includes a plurality of different radio access technologies such as e.g. at least two different radio access technologies selected from a group of radio access technologies consisting of:

- a Global System for Mobile Communication (GSM) radio access technology;
- a Global System for Mobile Communication (GSM) General Packet Radio Service (GPRS) radio access technology;
- a Global System for Mobile Communication (GSM) Enhanced General Packet Radio Service (EGPRS) radio access technology;
- a Universal Mobile Telecommunications System (UMTS) radio access technology;
- a Long Term Evolution (LTE) radio access technology (e.g. eUTRAN);
- a Code Division Multiple Access (CDMA) radio access technology;
- a Code Division Multiple Access 2000 (CDMA 2000) radio access technology;
- a Freedom of Mobile Multimedia Access (FOMA) radio access technology;
- a Fast Low-latency Access with Seamless Handoff-Orthogonal Frequency Division Multiplexing (Flash OFDM) radio access technology;
- a Time Division Synchronous Code Division Multiple Access (TD-SCDMA) radio access technology.

Any other cellular radio communication radio access technology may be provided in an alternative embodiment.

As shown in FIG. 1, the mobile radio communication system arrangement 100 may include a plurality of radio base stations, wherein at least some of the radio base stations may be configured to provide different radio access technologies, in other words, each one of the at least some of the radio base stations respectively provide a different radio access technology compared with the other radio base stations. Optionally, some of the radio base stations may provide the same radio access technologies, but may be provided by different radio service providers.

In an embodiment, the mobile radio communication system arrangement 100 may include

- a first radio base station 102 configured in accordance with GSM, run by a first GSM radio service provider;
- a second radio base station 104 configured in accordance with GSM, run by a second GSM radio service provider;
- a third radio base station 106 configured in accordance with GSM, run by a third GSM radio service provider;

a fourth radio base station 108 (also referred to as a first NodeB 108 in the following) configured in accordance with UMTS, run by a first UMTS radio service provider;

a fifth radio base station 110 (also referred to as a second NodeB 110 in the following) configured in accordance with UMTS, run by a second UMTS radio service provider; and a sixth radio base station 112 configured in accordance with LTE eUTRAN, run by an LTE eUTRAN radio service provider.

It should be noted that in an alternative embodiment, any number of base stations supporting different radio access technologies or provided by different radio service providers may be provided in the mobile radio communication system arrangement 100. In an embodiment, the mobile radio communication system arrangement 100 may include one base station configured in accordance with one radio access technology and another base station configured in accordance with another radio access technology, wherein the radio access technologies are different from one another.

Furthermore, the mobile radio communication system arrangement 100 may include a plurality of radio communication terminal devices (such as e.g. mobile radio communication terminal devices) 114, 116, 118, 120, 122, the structure of which will be described in more detail below.

In an embodiment, each base station 102, 104, 106, 108, 110, 112 provides communication connections to the radio communication terminal devices 114, 116, 118, 120, 122, in other words, the transmission of radio signals within at least one radio cell to the radio communication terminal devices 114, 116, 118, 120, 122. The transmission of radio signals may be provided in downlink direction (i.e. in the transmission direction from a network to a radio communication terminal device) and in uplink direction (i.e. in the transmission direction from a radio communication terminal device to a network) in accordance with communication protocols according to the respectively provided radio access technology.

A conventional global cell search in a multi-RAT environment is performed within each supported RAT independently. This means e.g. in a dual-mode, multi-band radio communication terminal device that first all possible and supported frequency bands of the first RAT are scanned for cell carriers by the local cell search procedure for the first RAT and then all possible and supported frequency bands of the second RAT are scanned for cell carriers by the again local cell search procedure for the second RAT.

A result of the conventional cell search procedures may be that the same frequency band (or frequency sub-band) may be completely scanned twice or even more often, disregarding any already identified cell carriers in any already scanned RAT. This scenario may e.g. occur if the same or a part of a defined frequency band of a RAT is also used for another RAT. By way of example, GSM 1900 and UMTS Band II, GSM 1800 and UMTS Band III, GSM 850 and UMTS Band V and UMTS Band VI, respectively use at least partially overlapping frequency regions.

In an embodiment, the following frequency bands are provided for the respective RATs for GSM:

GSM 850:
    824 MHz to 849 MHz (for signal transmission in uplink direction) and
    869 MHz to 894 MHz (for signal transmission in downlink direction);

GSM 900 (for example):
    890 MHz to 915 MHz (for signal transmission in uplink direction) and
    935 MHz to 960 MHz (for signal transmission in downlink direction);

GSM (Digital Cellular System, DCS) 1800:
    1710 MHz to 1785 MHz (for signal transmission in uplink direction) and
    1805 MHz to 1880 MHz (for signal transmission in downlink direction);

GSM (Personal Communications Services, PCS) 1900:
    1850 MHz to 1910 MHz (for signal transmission in uplink direction) and
    1930 MHz to 1990 MHz (for signal transmission in downlink direction).

In an embodiment, the following frequency bands are provided for the respective RATs for UMTS:

UMTS Band I (2100):
    1920 to 1980 MHz (for signal transmission in uplink direction) and
    2110 to 2170 MHz (for signal transmission in downlink direction);

UMTS Band II (1900):
    1850 to 1910 MHz (for signal transmission in uplink direction) and
    1930 to 1990 MHz (for signal transmission in downlink direction);

UMTS Band III (1800):
    1710 to 1785 MHz (for signal transmission in uplink direction) and
    1805 to 1880 MHz (for signal transmission in downlink direction);

UMTS Band IV (2100):
    1710 to 1755 MHz (for signal transmission in uplink direction) and
    2110 to 2155 MHz (for signal transmission in downlink direction);

UMTS Band V (850):
    824 to 849 MHz (for signal transmission in uplink direction) and
    869 to 894 MHz (for signal transmission in downlink direction);

UMTS Band VI (850):
    830 to 840 MHz (for signal transmission in uplink direction) and
    875 to 885 MHz (for signal transmission in downlink direction);

UMTS Band VII (2600):
    2500 to 2570 MHz (for signal transmission in uplink direction) and
    2620 to 2690 MHz (for signal transmission in downlink direction);

UMTS Band VIII:
    880 to 915 MHz (for signal transmission in uplink direction) and
    925 to 960 MHz (for signal transmission in downlink direction);

UMTS Band IX:
    1749.9 to 1784.9 MHz (for signal transmission in uplink direction) and
    1844.9 to 1879.9 MHz (for signal transmission in downlink direction);

UMTS Band X:
    1710 to 1770 MHz (for signal transmission in uplink direction) and
    2110 to 2170 MHz (for signal transmission in downlink direction);

UMTS Band XI:
    1427.9 to 1452.9 MHz (for signal transmission in uplink direction) and 1475.9 to 1500.9 MHz (for signal transmission in downlink direction).

Figure 2:
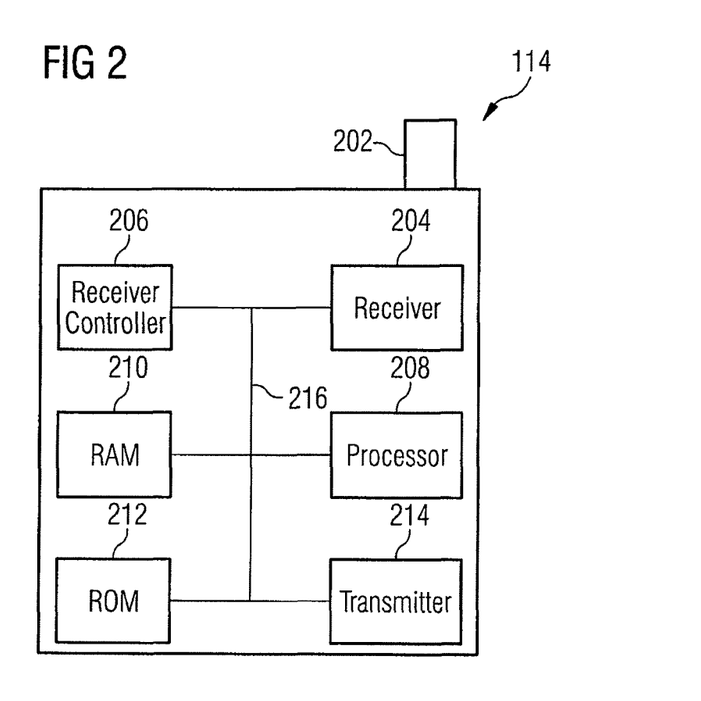
FIG. 2 shows a mobile radio communication terminal device in accordance with one embodiment.

FIG. 2 shows a mobile radio communication terminal device 114 in accordance with one embodiment. The other mobile radio communication terminal devices 116, 118, 120, 122 may have a similar structure. In an embodiment, the mobile radio communication terminal device 114 is a dual-mode mobile radio communication terminal device. In another embodiment, the mobile radio communication terminal device 114 is a triple-mode mobile radio communication terminal device. In an embodiment, the mobile radio communication terminal device 114 is configured to support four or even more different radio access technologies such as the ones mentioned above.

In an embodiment, the mobile radio communication terminal device 114 is configured to support GSM, UMTS and LTE eUTRAN.

The mobile radio communication terminal device 114 may include an antenna 202, a receiver 204 coupled to the antenna 202, a receiver controller 206 coupled to the receiver 204, a processor 208, a volatile or non-volatile random access memory (RAM) 210, a non-volatile read only memory (ROM) 212, and a transmitter 214, also coupled to the antenna 202. Furthermore, the mobile radio communication terminal device 114 may include e.g. a display, keys, a microphone, a loudspeaker and other conventional components of a mobile radio communication terminal device. In an embodiment, the antenna 202, the receiver 204, the receiver controller 206, the processor 208, the RAM 210, the ROM 212, and the transmitter 214 may be coupled with each other, e.g. via a connection structure such as e.g. via a interconnection bus 216.

The receiver 204 receives radio signals, e.g. from one or more base stations 102, 104, 106, 108, 110, 112, or from another one of the mobile radio communication terminal devices 116, 118, 120, 122, and the transmitter 214 transmits radio signals to one or more base stations 102, 104, 106, 108, 110, 112, or to another one of the mobile radio communication terminal devices 116, 118, 120, 122. Furthermore, the receiver 204 stores the received radio signals in a memory such as e.g. in the RAM 210. The receiver controller 206 controls the receiver 204. In an embodiment, the receiver controller 206 may control the receiving frequency (e.g. the receiving frequency window), e.g. including the center receiving frequency of the receiver 204. The receiver controller 206 may be configured to control the receiver 204 during a search for a radio cell (in other words, during a cell search procedure) such that at least one frequency band of a first radio access technology is scanned, at least one frequency sub-band of the first radio access technology that fulfils a predetermined criterion is determined, at least one frequency band of a second radio access technology is scanned, wherein the at least one frequency band of the second radio access technology at least partially overlaps with the at least one frequency band of the first radio access technology, wherein the determined at least one frequency sub-band of the first radio access technology is not scanned in the at least one frequency band of the second radio access technology.

The receiver controller 206 as well as the processor 208 may be any type of hard-wired logic or programmable logic implementing the required functionality, e.g. implementing the procedures in accordance with the described embodiments. A programmable logic may be e.g. a programmable processor such as e.g. a microprocessor (e.g. a Complex Instruction Set Computer (CISC) processor or a Reduced Instruction Set Computer (RISC) processor). The computer program code for the receiver controller 206 as well as the processor 208 may be stored in the ROM 212. In an embodiment, the receiver controller 206 and the processor 208 may be monolithically integrated in one processor. In other words, in an embodiment, one processor is provided to provide the functions of the receiver controller 206 and of the processor 208. The processor 208 may be provided for the conventional functions of a radio communication terminal device.

When the mobile radio communication terminal device 114 wants to select a radio base station 102, 104, 106, 108, 110, 112, and thus wants to select a radio cell it can camp on, it may carry out a radio cell search procedure. In an embodiment, the mobile radio communication terminal device 114 carries out a radio cell search procedure just after having been switched on. In an alternative embodiment, the mobile radio communication terminal device 114 carries out a radio cell search procedure after he has moved into a region where it has lost coverage of the radio cell he had been camped on.

As will be described in more detail below, various embodiments fulfil increased time requirements for cell search in a multi-RAT environment, in other words, in a radio communication system arrangement including a plurality of different RATs. Furthermore, various embodiments provide new solutions for a more advanced global cell search procedure that improves the global cell search time in a multi-RAT environment.

In an embodiment, the receiver controller 206 is further configured to control the receiver 204 during a search for a radio cell such that at least one frequency sub-band of the second radio access technology that fulfils a predetermined criterion is determined, at least one frequency band of a third radio access technology is scanned, wherein the at least one frequency band of the third radio access technology at least partially overlaps with the at least one frequency band of the first radio access technology and with the at least one frequency band of the second radio access technology, wherein the determined at least one frequency sub-band of the first radio access technology and the determined at least one frequency sub-band of the second radio access technology are not scanned in the at least one frequency band of the third radio access technology.

As described above, at least one radio access technology of the radio access technologies may be selected from a group of radio access technologies consisting of (in which case, the radio communication terminal device is configured to provide the respectively provided communication protocols in accordance with the respective RAT):

Global System for Mobile Communication radio access technology;

a Global System for Mobile Communication (GSM) General Packet Radio Service (GPRS) radio access technology;

a Global System for Mobile Communication (GSM) Enhanced General Packet Radio Service (EGPRS) radio access technology;

Universal Mobile Telecommunications System radio access technology;

Universal Mobile Telecommunications System Long Term Evolution radio access technology;

Code Division Multiple Access radio access technology;

Code Division Multiple Access 2000 radio access technology;

Freedom of Mobile Multimedia Access radio access technology;

Fast Low-latency Access with Seamless Handoff-Orthogonal Frequency Division Multiplexing (Flash OFDM) radio access technology;

Time Division Synchronous Code Division Multiple Access (TD-SCDMA) radio access technology.

As will be described in more detail below, the order according to which the respective RAT is scanned may vary. In an embodiment, it may be provided to start with the RAT having the largest frequency bandwidth and then scan the RAT having the second largest frequency bandwidth, and so on. In an embodiment, it may be provided to start with the RAT having the largest cell bandwidth of a radio cell thereof and then scan the RAT having the second largest cell bandwidth of a radio cell thereof, and so on.

Thus, in this embodiment, the frequency band of the first radio access technology (in an alternative embodiment, the cell bandwidth of a radio cell of the first radio access technology) is larger than the frequency band of the second radio access technology (in an alternative embodiment, than the cell bandwidth of a radio cell of the second radio access technology). In yet an alternative embodiment, it may be provided to start with the RAT the frequencies of which may be scanned fastest, and then scan the RAT the frequencies of which may be scanned second fastest, and so on. In this embodiment, in other words, the frequency band of the first radio access technology can be scanned faster than the frequency band of the second radio access technology.

Furthermore, the radio communication terminal device 114 may further include a selecting circuit configured to select a radio cell depending on the scanning of the frequency band of the first radio access technology and the scanning of the frequency band of the second radio access technology. In an embodiment, the selecting circuit may be implemented by the processor 208. In an alternative embodiment, a separate circuit may be provided.

Figure 3:
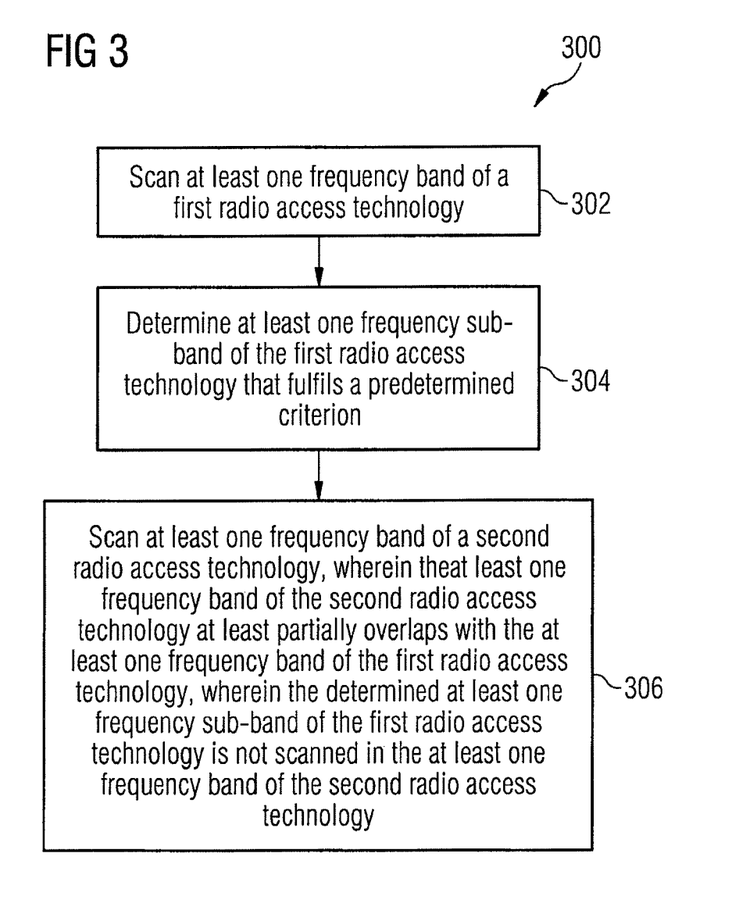
FIG. 3 shows a flow diagram illustrating a method for searching for a radio cell in accordance with one embodiment.

FIG. 3 shows a flow diagram 300 illustrating a method for searching for a radio cell in accordance with one embodiment.

In 302, at least one frequency band of a first radio access technology is scanned.

In 304, at least one frequency sub-band of the first radio access technology that fulfils a predetermined criterion. In an embodiment, the predetermined criterion may be that a carrier signal of the first radio access technology has been detected in the at least one frequency sub-band, in other words, one predetermined criterion may be that a cell has been detected in the at least one frequency sub-band, and the required cell information has been decoded (e.g. as required to identify the radio cell and to determine the frequency bandwidth used). Alternatively, the predetermined criterion may be that a signal of a signal strength greater than a predetermined signal threshold value has been detected in the at least one frequency sub-band.

In 306, at least one frequency band of a second radio access technology is scanned. In an embodiment, the at least one frequency band of the second radio access technology at least partially overlaps (in other words partially or fully overlaps) with the at least one frequency band of the first radio access technology. Furthermore, the determined at least one frequency sub-band of the first radio access technology is not scanned in the at least one frequency band of the second radio access technology. In other words, the determined sub-bands are skipped during the scanning process of the second radio access technology.

In an embodiment, the method may further include determining at least one frequency sub-band of the second radio access technology that fulfils a predetermined criterion, and scanning at least one frequency band of a third radio access technology, wherein the at least one frequency band of the third radio access technology at least partially overlaps with the at least one frequency band of the first radio access technology and with the at least one frequency band of the second radio access technology, wherein the determined at least one frequency sub-band of the first radio access technology and the determined at least one frequency sub-band of the second radio access technology are not scanned in the at least one frequency band of the third radio access technology.

This procedure may be applied generally in an analogous manner to an arbitrary number of radio access technologies.

As will be described in more detail below, various embodiments provide the basis for a faster (global) cell search procedure in a multi-RAT environment by using information gathered within the (local) cell search procedure performed in a RAT during the (local) cell search procedure of other RATs. In an embodiment, all identified radio cell carriers which have been found in a (local) cell search procedure are stored and thus illustratively globally remembered and these stored identified radio cell carriers are excluded from subsequent (local) cell searches in other RATs.

FIGS. 4A to 4D show a multi-RAT environment and deployment scenario in accordance with one embodiment.

Figures 4A, 4B:
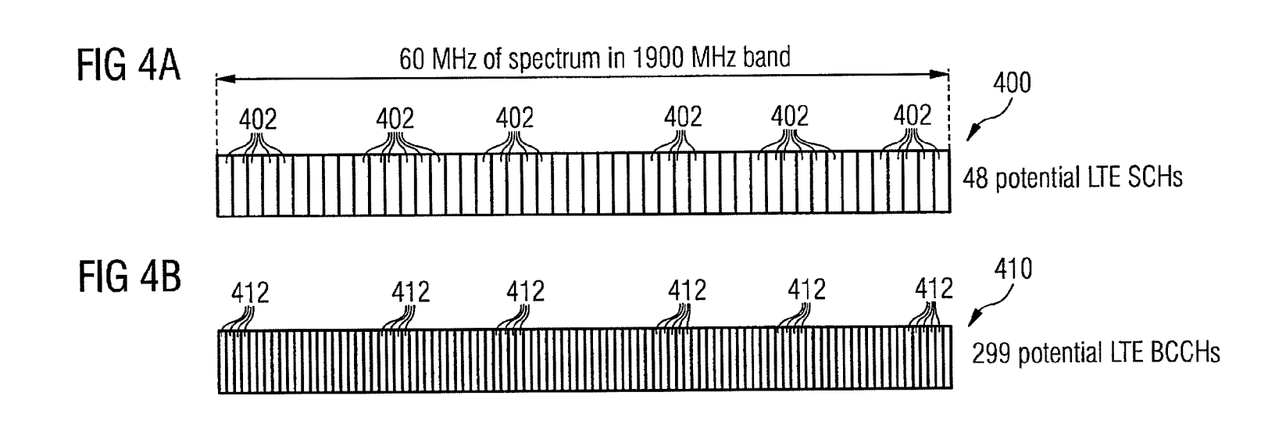
FIGS. 4A to 4D show a multi-RAT environment and deployment scenario in accordance with one embodiment.
Figures 4C, 4D:
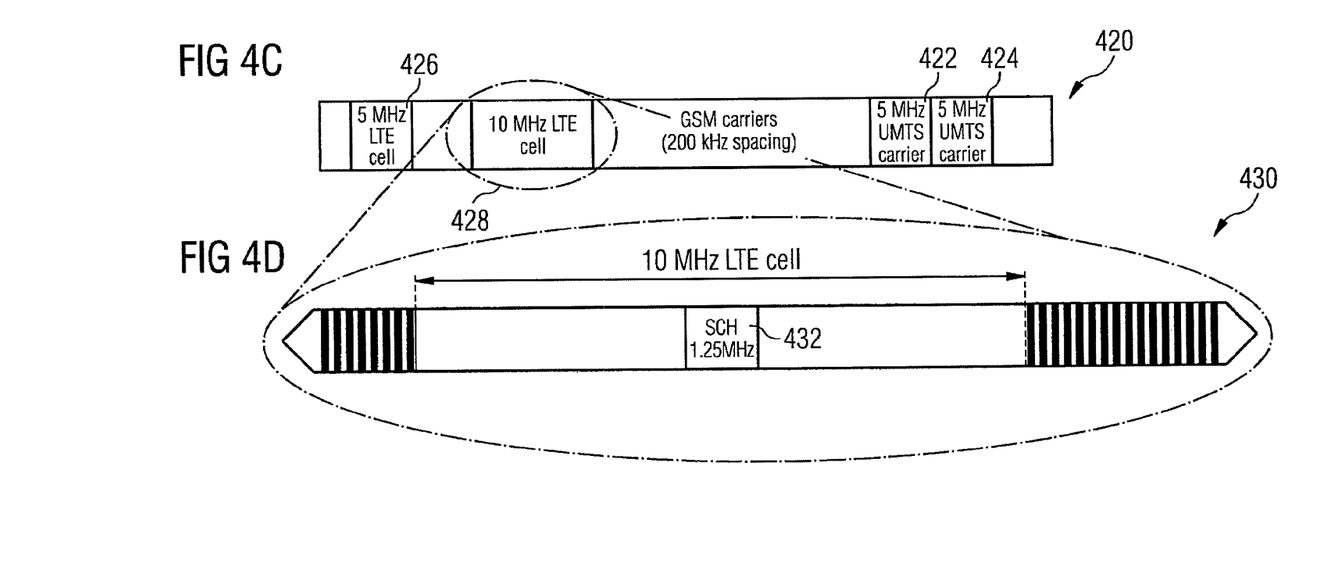

As an example, a 60 MHz frequency band portion of a spectrum in a 1900 MHz frequency band is illustrated in FIG. 4A. Furthermore, FIG. 4A shows 48 potential LTE Synchronization Channels (SCH) 402 in a first diagram 400. Furthermore, FIG. 4B shows 299 potential GSM Broadcast Control Channels (BCCH) 412 in a second diagram 410. In an embodiment, it is assumed that the local GSM cell search procedure is the last one to be performed in a sequence of radio cell search procedures in a triple-mode radio communication terminal device (in this embodiment being capable of supporting the RATs GSM, UMTS, and LTE). In this example, the UMTS cell search procedure has already identified two UMTS cell carriers, namely a first UMTS cell carrier 422 and a second UMTS cell carrier 424 (see third diagram 420 in FIG. 4C). Each of the UMTS cell carriers 422, 424 occupies 5 MHz bandwidth in the considered frequency band. Furthermore, the LTE cell search procedure has identified two LTE cells, a first LTE cell carrier 426 occupying 5 MHz and a second LTE cell carrier 428 occupying 10 MHz bandwidth in the considered frequency band. By using information from the UMTS cell search procedure and the LTE cell search procedure for the subsequent GSM cell search procedure, e.g. 25 MHz out of the 60 MHz frequency band can be skipped during the GSM cell search procedure (since the already found UMTS cell carriers 422, 424 and LTE cell carriers 426, 428 are not scanned during the GSM cell search procedure), yielding in a significant reduction of GSM cell search time. FIG. 4D shows the second LTE cell carrier 428 occupying 10 MHz bandwidth in more detail in a fourth diagram 440. In this example, the second LTE cell carrier 428 includes a Synchronization Channel (SCH) 432 of a bandwidth of 1.25 MHz.

Figure 5:
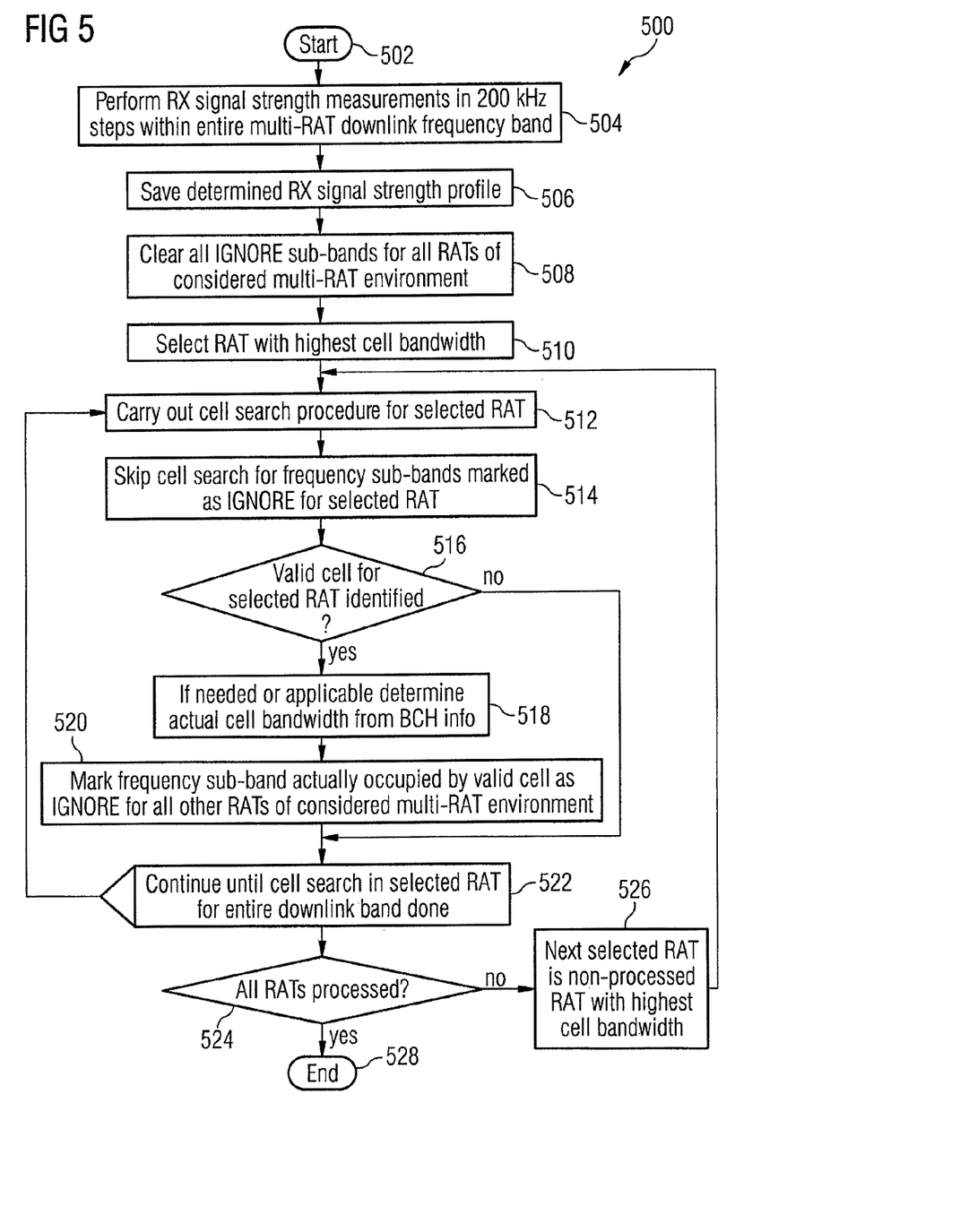
FIG. 5 shows a flow diagram illustrating a method for searching for a radio cell in accordance with another embodiment.

FIG. 5 shows a flow diagram 500 illustrating a method for searching for a radio cell in accordance with another embodiment.

The method is started in 502.

In an embodiment, in 504, the radio cell search is carried out by scanning all supported frequency bands for cell carrier detection in steps of 200 kHz. In an embodiment, to do this, received signal strength measurements are performed in 200 kHz steps within the entire multi-RAT downlink frequency band.

Furthermore, the embodiment shown in FIG. 5 implements an order of local cell searches starting with the RAT that allows the largest cell carrier bandwidth.

Then, in 506, a received signal strength profile is determined from the measured received signal strengths and is stored in a storage of the radio communication terminal device (such as e.g. the radio communication terminal device 114).

In 508, all previously set IGNORE flags assigned to frequency sub-bands for all RATs of the considered multi-RAT environment are cleared.

Next, in 510, the RAT having the highest radio cell bandwidth is selected as e.g. the first RAT.

In an embodiment, it may be provided to read and interpret higher communication protocol layer information, which may be distributed e.g. on a radio cell's broadcast channel (BCH), in order to finally determine the actual bandwidth of a radio cell. This applies e.g. for LTE radio cells with a fixed BCH bandwidth and a "configurable" radio cell bandwidth. By way of example, for LTE, the SCH and the BCH are supposed to use a fixed constant bandwidth of 1.25 MHz, while the actual downlink transmission bandwidth of the cell may vary between 1.25 MHz up to 20 MHz. The actual transmission bandwidth of a radio cell is determined by retrieving corresponding information that is broadcasted within a radio cell on the radio cell's BCH. This kind of cell bandwidth information is usually periodically transmitted on the BCH. For LTE, a repetition rate of 40 ms may be provided. Having identified the SCH/BCH at the center carrier frequency of the radio cell and having subsequently read the actual radio cell transmission bandwidth, the complete radio cell transmission frequency sub-band can be marked as "to be ignored" for other RATs in a subsequent radio cell search procedure.

All recognized cell carriers detected in a local cell search procedure are marked as "to be ignored" (e.g. by setting a correspondingly provided IGNORE flag) and this global or exchanged information may be used by all other local cell search procedures. The time needed for local cell search procedures can now be optimized by skipping all frequency ranges (e.g. all frequency sub-bands) belonging to such marked cell carriers.

In 514, the radio cell search is skipped for frequency sub-bands that have already been marked as a to be ignored Furthermore, in 516, it is determined as to whether a valid radio cell for the selected RAT has been identified.

In case that a valid radio cell for the selected RAT has been identified ("Yes" in 516), if required or if applicable, in 518, the actual bandwidth is determined from the BCH Info field of the BCH signals.

Furthermore, in 520, the frequency sub-band that is occupied by the determined valid radio cell is marked as "to be ignored" (e.g. corresponding flag being assigned to the frequency sub-band is set to "IGNORE") for all other RATs of the considered multi-RAT environment.

The processes 512, 514, 516, 518, 520, are repeated until the radio cell search in the selected RAT is done (in other words, completed) for the entire downlink frequency range (symbolized in FIG. 5 by means of block 522).

In case that a valid radio cell for the selected RAT has not been identified ("No" in 516), the method continues in block 522.

When the radio cell search in the selected RAT is done for the entire downlink frequency range, the method continues in 524, where it is determined as to whether all RATs have been processed or not.

In case not all RATs have yet been processed ("No" in 524), a next RAT is selected. In an embodiment, the next selected RAT may be the not yet processed RAT with the highest bandwidth within the not yet processed RATs. Then, the method continues with the newly selected RAT in 512.

In case all RATs have been processed ("Yes" in 524), the method ends in 528.

In an embodiment, a priori knowledge about the respective RAT may also be taken into account during the global radio cell search procedure.

By way of example, many radio access technologies use paired spectra (also referred to as paired frequency bands in the following) for the transmission of signals in the downlink direction, and in the uplink direction. Knowledge about RATs using paired frequency bands can be used for speeding up the cell search procedure in accordance with an embodiment.

If a downlink signal can be detected by the radio communication terminal device belonging to such a RAT, then it is in the above mentioned case implicitly clear, that in the uplink spectrum of the paired bands a different RAT cannot be deployed, and the concerning frequency range can be marked as occupied (in other words, as "to be ignored"). No search for radio cells belonging to a different RAT needs then to be performed in this frequency range.

Examples of RATs using paired bands are GSM, UMTS in Frequency Division Duplex (FDD) mode, and LTE eUTRAN in Frequency Division Duplex (FDD) mode.

In order to demonstrate how prior knowledge about the RAT deployed in a certain area can help to speed up radio cell search, the following example is considered: a UMTS carrier is found in frequency band Band IV (see above), spanning over a downlink frequency range from 2112.4 MHz to 2217.4 MHz. This downlink carrier is paired with a frequency range for the uplink from 1712.4 MHz to 1717.4 MHz, which covers part of the DCS 1800 uplink frequency range (1710 MHz to 1785 MHz, see above). This means that the corresponding downlink frequencies of the DCS 1800 system do not need to be searched for carriers belonging to GERAN.

In an embodiment, the radio cell to be used may be selected and the time synchronization and the frame synchronization may e.g. be carried out for the selected radio cell. In this context, by way of example, also scrambling codes which may be used for the data transmission may be determined.

In an embodiment, the order of performing local radio cell searches may be configurable, i.e. it can be determined by configuration in a global cell search procedure perspective which RAT is handled first, which second, which third, and so on.

In an embodiment, the following aspects may be considered for deciding on an order in which RATs are processed during the global cell search procedure:

(Maximum) cell carrier bandwidth as defined for a RAT by standardization:

In this case, the order of performing local radio cell searches for the considered RATs is determined by the maximum bandwidth a cell carrier can occupy. RATs may be processed in order of decreasing maximum radio cell carrier bandwidth. This is the approach shown in FIG. 5.

Time to detect a cell carrier of a RAT as determined by implementation:

It may happen that due to implementation or technical constraints the scanning of a certain frequency band for cell carriers in one RAT takes considerably more time than scanning the same frequency band for cell carriers of another RAT. Then, even if another RAT supports larger cell carrier frequency bands, it may be advisable to start the global cell search procedure with the RAT allowing faster scanning of a given frequency band or frequency sub-band.

As described above, various embodiments allow the speed-up of a global cell search procedure in a multi-RAT environment by exchanging and making use of information from the individual local cell search procedure being performed in such an environment. In an embodiment, already recognized cell carriers in one RAT may be ignored within subsequent cell search procedures of other RATs.

This approach can be applied for all RATs completely or partly sharing the same frequency band(s), for which cells cannot co-exist at exactly the same carrier frequency. This is e.g. true for UMTS cells and GSM cells, where no GSM cell carriers can occur within the 5 MHz frequency band occupied by a UMTS cell carrier.

It should be mentioned that the embodiments are not limited to mobile radio communication technology or mobile radio communication devices, not even to terrestrial radio communication technology or terrestrial radio communication devices. Embodiments may also be applied to satellite-based radio communication technology or satellite-based radio communication devices.

While the subject matter of the application has been particularly shown and described with reference to specific embodiments, it should be understood by those skilled in the art that various changes in form and detail may be made therein without departing from the spirit and scope of the application as defined by the appended claims. The scope of the application is thus indicated by the appended claims and all changes which come within the meaning and range of equivalency of the claims are therefore intended to be embraced.

What is claimed is:

1. A radio communication device, comprising:
a receiver receiving at least one radio signal;
a receiver controller coupled to the receiver and configured to control scanning of at least one frequency band received during a search for a radio cell,
wherein the at least one frequency band comprises at least one frequency band of a first radio access technology and at least one frequency band of a second radio access technology that at least partially overlaps the at least one frequency band of the first radio access technology;
wherein the receiver controller is configured to scan the at least one frequency band of the first radio access technology to determine at least one frequency sub-band that fulfils a predetermined criteria; and
wherein the receiver controller is configured to scan the at least one frequency band of the second radio access technology skipping the at least one frequency sub-band.

2. The radio communication device of claim 1,
wherein the receiver controller is further configured to control scanning of at least one frequency band received during a search for a radio cell such that
at least one frequency sub-band of the second radio access technology that fulfils a predetermined criterion is determined;
at least one frequency band of a third radio access technology is scanned, wherein the at least one frequency band of the third radio access technology at least partially overlaps with the at least one frequency band of the first radio access technology and with the at least one frequency band of the second radio access technology; and
wherein the receiver controller is configured to scan the at least one frequency band of the third radio access technology skipping the at least one frequency sub-band of the first radio access technology and the at least one frequency sub-band of the second radio access technology.

3. The radio communication device of claim 1,
wherein at least one radio access technology of the radio access technologies is selected from a group of radio access technologies consisting of:
Global System for Mobile Communication radio access technology;
Universal Mobile Telecommunications System radio access technology;
Universal Mobile Telecommunications System Long Term Evolution radio access technology;
Code Division Multiple Access radio access technology;
Code Division Multiple Access 2000 radio access technology;
Freedom of Mobile Multimedia Access radio access technology;
Fast Low-latency Access with Seamless Handoff—Orthogonal Frequency Division Multiplexing radio access technology; and
Time Division Synchronous Code Division Multiple Access radio access technology.

4. The radio communication device of claim 1,
being configured as a radio communication terminal device.

5. The radio communication device of claim 1,
wherein at least one cell bandwidth of a radio cell of the first radio access technology is larger than at least one cell bandwidth of a radio cell of the second radio access technology.

6. The radio communication device of claim 1,
wherein the at least one frequency band of the first radio access technology can be scanned faster than the at least one frequency band of the second radio access technology.

7. The radio communication device of claim 1, further comprising:
a storage configured to store information about the received signals received according to the first radio access technology and about the received signals received according to the second radio access technology.

8. The radio communication device of claim 1, further comprising:
a selecting circuit configured to select a radio cell depending on the scanning of the at least one frequency band of the first radio access technology and the scanning of the at least one frequency band of the second radio access technology.

9. A radio communications device comprising:
a receiver receiving at least one radio signal;
a receiver controller coupled to the receiver and configured to control scanning of at least one frequency band received during a search for a radio cell,
wherein the at least one frequency band comprises at least one frequency band of a first radio access technology and at least one frequency band of a second radio access technology that at least partially overlaps the at least one frequency band of the first radio access technology;
wherein the receiver controller is configured to identify at least one frequency sub-band that fulfils a predetermined criteria during scanning of the at least one frequency band of the first radio access technology; and
wherein the receiver controller is configured to ignore the one frequency sub-band during scanning of the at least one frequency band of the second radio access technology.

10. The radio communications device of claim 9,
wherein the receiver controller is further configured to control scanning of at least one frequency band received during a search for a radio cell such that
at least one frequency sub-band that fulfils a predetermined criteria during scanning of the at least one frequency band of the second radio access technology is identified;
at least one frequency band of a third radio access technology is scanned, wherein the at least one frequency band of the third radio access technology at least partially overlaps with the at least one frequency band of the first radio access technology and with the at least one frequency band of the second radio access technology; and
wherein the receiver controller is configured to scan the at least one frequency band of the third radio access technology ignoring the at least one frequency sub-band of the first radio access technology and the at least one frequency sub-band of the second radio access technology.

11. The radio communications device of claim 9,
wherein at least one radio access technology of the radio access technologies is selected from a group of radio access technologies consisting of:
Global System for Mobile Communication radio access technology;
Universal Mobile Telecommunications System radio access technology;
Universal Mobile Telecommunications System Long Term Evolution radio access technology;
Code Division Multiple Access radio access technology;
Code Division Multiple Access 2000 radio access technology; Freedom of Mobile Multimedia Access radio access technology;
Fast Low-latency Access with Seamless Handoff—Orthogonal Frequency Division Multiplexing radio access technology; and
Time Division Synchronous Code Division Multiple Access radio access technology.

12. The radio communications device of claim 9,
wherein the cell bandwidth of a radio cell of the first radio access technology is larger than the cell bandwidth of a radio cell of the second radio access technology.

13. The radio communications device of claim 9,
wherein the at least one frequency band of the first radio access technology can be scanned faster than the at least one frequency band of the second radio access technology.

14. The radio communications device of claim 9, further comprising:
a storage configured to store information about the received signals received according to the first radio access technology and about the received signals received according to the second radio access technology.

15. A method for operating a radio communication terminal device, the method comprising:
scanning, by the radio communication terminal device, at least one frequency band received during a search for a radio cell, wherein the at least one frequency band comprises at least one frequency band of a first radio access technology and at least one frequency band of a second radio access technology that at least partially overlaps the at least one frequency band of the first radio access technology;
determining, by the radio communication terminal device, at least one frequency sub-band of the first radio access technology that fulfils a predetermined criterion; and
scanning, by the radio communication terminal device, at least one frequency band of a second radio access technology, wherein the at least one frequency sub-band is skipped.

16. The method of claim 15, further comprising:
determining, by the radio communication terminal device, at least one frequency sub-band of the second radio access technology that fulfils a predetermined criterion; and
scanning, by the radio communication terminal device, at least one frequency band of a third radio access technology, wherein the at least one frequency band of the third radio access technology at least partially overlaps with the at least one frequency band of the first radio access technology and with the at least one frequency band of the second radio access technology;
wherein the determined at least one frequency sub-band of the first radio access technology and the determined at least one frequency sub-band of the second radio access technology are skipped in the at least one frequency band of the third radio access technology.

17. The method of claim 15,
wherein at least one radio access technology of the radio access technologies is selected from a group of radio access technologies consisting of:
Global System for Mobile Communication radio access technology;
Universal Mobile Telecommunications System radio access technology;
Universal Mobile Telecommunications System Long Term Evolution radio access technology;
Code Division Multiple Access radio access technology;
Code Division Multiple Access 2000 radio access technology;
Freedom of Mobile Multimedia Access radio access technology;
Fast Low-latency Access with Seamless Handoff—Orthogonal Frequency Division Multiplexing radio access technology; and
Time Division Synchronous Code Division Multiple Access radio access technology.

18. The method of claim 15, wherein the first radio access technology is selected such that a cell bandwidth of a radio cell of the first radio access technology is larger than a cell bandwidth of a radio cell of the second radio access technology.

19. The method of claim 15,
wherein the first radio access technology is selected such that the at least one frequency band of the first radio access technology can be scanned faster than the at least one frequency band of the second radio access technology.

20. The method of claim 15, further comprising:
storing information, by the radio communication terminal device, about the received signals received according to the first radio access technology and about the received signals received according to the second radio access technology.

21. The method of claim 15, further comprising:
selecting, by the radio communication terminal device, a radio cell depending on the scanning of the at least one frequency band of the first radio access technology and the scanning of the at least one frequency band of the second radio access technology.

22. A method for operating a radio communication terminal device, the method comprising:
- scanning, by the radio communication terminal device, at least one frequency band received during a search for a radio cell, wherein the at least one frequency band comprises at least one frequency band of a first radio access technology and at least one frequency band of a second radio access technology that at least partially overlaps the at least one frequency band of the first radio access technology;
- identifying, by the radio communication terminal device, at least one frequency sub-band of the first radio access technology that fulfils a predetermined criterion; and
- scanning, by the radio communication terminal device, at least one frequency band of a second radio access technology, wherein the at least one frequency sub-band is ignored.

23. The method of claim 22, further comprising:
- identifying, by the radio communication terminal device, at least one frequency sub-band of the second radio access technology that fulfils a predetermined criterion; and
- scanning, by the radio communication terminal device, at least one frequency band of a third radio access technology, wherein the at least one frequency band of the third radio access technology at least partially overlaps with the at least one frequency band of the first radio access technology and with the at least one frequency band of the second radio access technology;
- wherein the determined at least one frequency sub-band of the first radio access technology and the determined at least one frequency sub-band of the second radio access technology are ignored in the at least one frequency band of the third radio access technology.

24. The method of claim 22,
- wherein at least one radio access technology of the radio access technologies is selected from a group of radio access technologies consisting of:
- Global System for Mobile Communication radio access technology;
- Universal Mobile Telecommunications System radio access technology;
- Universal Mobile Telecommunications System Long Term Evolution radio access technology;
- Code Division Multiple Access radio access technology;
- Code Division Multiple Access 2000 radio access technology;
- Freedom of Mobile Multimedia Access radio access technology;
- Fast Low-latency Access with Seamless Handoff—Orthogonal Frequency Division Multiplexing radio access technology; and
- Time Division Synchronous Code Division Multiple Access radio access technology.

25. The method of claim 22, wherein the first radio access technology is selected such that a cell bandwidth of a radio cell of the first radio access technology is larger than a cell bandwidth of a radio cell of the second radio access technology.

26. The method of claim 22,
- wherein the first radio access technology is selected such that the at least one frequency band of the first radio access technology can be scanned faster than the at least one frequency band of the second radio access technology.

27. The method of claim 22, further comprising:
- storing information, by the radio communication terminal device, about the received signals received according to the first radio access technology and about the received signals received according to the second radio access technology.

28. The method of claim 22, further comprising:
- selecting, by the radio communication terminal device, a radio cell depending on the scanning of the at least one frequency band of the first radio access technology and the scanning of the at least one frequency band of the second radio access technology.

* * * * *